US010179406B2

(12) United States Patent
Dalibard et al.

(10) Patent No.: US 10,179,406 B2
(45) Date of Patent: Jan. 15, 2019

(54) HUMANOID ROBOT WITH COLLISION AVOIDANCE AND TRAJECTORY RECOVERY CAPABILITIES

(71) Applicant: SOFTBANK ROBOTICS EUROPE, Paris (FR)

(72) Inventors: Sébastien Dalibard, Paris (FR); Aldenis Garcia, Paris (FR); Cyrille Collette, Le Plessis Robinson (FR); Nicolas Garcia, Paris (FR); Lucas Souchet, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 22 days.

(21) Appl. No.: 15/311,800

(22) PCT Filed: Jun. 5, 2015

(86) PCT No.: PCT/EP2015/062603
§ 371 (c)(1),
(2) Date: Nov. 16, 2016

(87) PCT Pub. No.: WO2015/185738
PCT Pub. Date: Dec. 10, 2015

(65) Prior Publication Data
US 2017/0080565 A1    Mar. 23, 2017

(30) Foreign Application Priority Data

Jun. 5, 2014   (EP) ..................... 14305850

(51) Int. Cl.
*B25J 9/16*    (2006.01)
*B25J 11/00*   (2006.01)
*G05D 1/02*    (2006.01)

(52) U.S. Cl.
CPC ........... *B25J 9/1676* (2013.01); *B25J 9/1694* (2013.01); *B25J 9/1697* (2013.01);
(Continued)

(58) Field of Classification Search
CPC .... B25J 9/0006; B25J 11/055; B25J 11/0035; B25J 9/16; B25J 9/1694; B25J 9/1697; G05B 2219/39091; G05D 1/0214
See application file for complete search history.

(56) References Cited

U.S. PATENT DOCUMENTS

| 7,778,776 B2 | 8/2010 | Goto et al. |
| 2004/0096083 A1 | 5/2004 | Matsunaga et al. |

(Continued)

FOREIGN PATENT DOCUMENTS

| EP | 1 635 107 A1 | 3/2006 |
| EP | 2 933 065 A1 | 10/2015 |

(Continued)

OTHER PUBLICATIONS

Fang, Xudong Ma and Xianzhong Dai, "A multi-sensor fusion SLAM approach for mobile robots," IEEE International Conference Mechatronics and Automation, 2005, 2005, pp. 1837-1841 vol. 4. (Year: 2005).*

*Primary Examiner* — Adam R Mott
(74) *Attorney, Agent, or Firm* — Baker & Hostetler LLP

(57) ABSTRACT

A humanoid robot which can move on its lower limb to execute a trajectory and is capable of detecting intrusion of obstacles in a safety zone defined around its body as a function of its speed is provided. Preferably when the robot executes a predefined trajectory, for instance a part of a choreography, the robot which avoids collision with an obstacle will rejoin its original trajectory after avoidance of the obstacle. Rejoining trajectory and speed of the robot are adapted so that it is resynchronized with the initial trajectory.

(Continued)

Advantageously, the speed of the joints of the upper members of the robot is adapted in case the distance with an obstacle decreases below a preset minimum. Also, the joints are stopped in case a collision of the upper members with the obstacle is predicted.

15 Claims, 8 Drawing Sheets

(52) U.S. Cl.
CPC ........ *B25J 11/0035* (2013.01); *G05D 1/0214* (2013.01); *G05B 2219/39091* (2013.01); *G05D 2201/0217* (2013.01); *Y10S 901/01* (2013.01)

(56) References Cited

U.S. PATENT DOCUMENTS

| 2006/0049939 | A1* | 3/2006 | Haberer | ................... F16P 3/142 340/541 |
|---|---|---|---|---|
| 2009/0074252 | A1* | 3/2009 | Dariush | ............. G11C 11/5621 382/107 |
| 2009/0224867 | A1* | 9/2009 | O'Shaughnessy | ........................... H04M 1/72569 340/5.1 |
| 2009/0326713 | A1 | 12/2009 | Moriya | |
| 2011/0298579 | A1* | 12/2011 | Hardegger | ................ F16P 3/14 340/3.1 |
| 2012/0061155 | A1* | 3/2012 | Berger | ..................... B25J 5/007 180/21 |
| 2014/0005827 | A1 | 1/2014 | Ogawa et al. | |

FOREIGN PATENT DOCUMENTS

| EP | 2 952 300 A1 | 12/2015 |
|---|---|---|
| EP | 2 952 993 A1 | 12/2015 |
| WO | 2009/055707 A1 | 4/2009 |
| WO | 2009/124955 A2 | 10/2009 |

* cited by examiner

HUMANOID ROBOT WITH COLLISION AVOIDANCE AND TRAJECTORY RECOVERY CAPABILITIES

CROSS-REFERENCE TO RELATED APPLICATIONS

This application is a National Stage of International patent application PCT/EP2015/062603, filed on Jun. 5, 2015, which claims priority to foreign European patent application No. EP 14305850.1, filed on Jun. 5, 2014, the disclosures of which are incorporated by reference in their entirety.

FIELD OF THE INVENTION

The present invention relates to the field of robot programming systems. More specifically, it applies to the editing and controlling of behaviors and motions of robots which move around on articulated limbs or use them, notably robots of human or animal form.

BACKGROUND PRIOR ART

A robot can be qualified as humanoid from the moment when it has certain human appearance attributes: a head, a trunk, two arms, two hands, etc. A humanoid robot may, however, be more or less sophisticated. Its limbs may have a greater or lesser number of articulations. It may control its own balance statically and dynamically and walk on two limbs, possibly in three dimensions, or simply roll over a base. It may pick up signals from the environment ("hear", "see", "touch", "sense", etc.) and react according to more or less sophisticated behaviors, and interact with other robots or humans, either by speech or by gesture.

A humanoid robot may navigate in a given environment just to go from a point A to a point B, or a according to a predefined scenario, or even execute a dance. There even may be a plurality of humanoid robots that collaborate in a choreography. In all these scenarios, it is important that the robots may cope with unexpected situations, for instance when obstacles come across their trajectory or the movements of their members. Also, it is more and more important to develop the impression that the robot is indeed humanoid that the robot be capable of coping with these unexpected situations in a human-like way, i.e. with smooth changes of trajectory or gestures to avoid collision instead of brisk changes of directions which denote a mechanical behavior. Also, when to avoid of collision a robot must change its trajectory or interrupt a gesture which was executed before the avoidance sequence, it is highly desirable to have the robot resume its previous trajectory or gestures, as a human would do.

In some solutions of the prior art, collision avoidance is mostly dealt with by putting the robot in a safety mode, either by commanding an abrupt stop or change in direction before collision. This is of course not a satisfactory user experience.

Another solution, provided notably by U.S. Pat. No. 7,778,776 consists in setting non-invasion or safety areas around obstacles and stopping the robot at a braking distance, or calculating an avoidance path. But this solution of the prior art is very computer intensive, since safety areas have to be calculated for all obstacles.

SUMMARY OF THE INVENTION

The invention solves this problem by computing a safety area around the robot, so that a single safety area needs to be maintained.

To this effect, the invention discloses a method for controlling a trajectory of at least one of upper and lower members of a humanoid robot, said method comprising: storing an initial trajectory with a target point in a memory of the robot; acquiring, from at least a sensing procedure controlled from on-board the robot, data representative of a position of one or more obstacles; calculating, by a processor on-board the robot: an envelope of one of a footprint of said robot and said at least one of upper and lower members thereof; a relative position of the envelope and the one or more obstacles; a probability of collision of the envelope with an obstacle; and, a series of commands to change at least one of the trajectory and a speed of the at least one of upper and lower members of the robot; said method being characterized in that the series of commands is conditioned in at least one of space and time to: i) avoid collision of the envelope with an obstacle; and ii) when adequate and possible, rejoin the target point of the initial trajectory stored in memory.

Advantageously, the initial trajectory is referenced in space and time.

Advantageously, the sensing procedure is performed by at least one of a plurality of laser lines generators, a plurality of imaging sensors, a plurality of acoustic sensors and a plurality of contact detectors.

Advantageously, the sensing procedure is performed by at least two of a plurality of laser lines generators, a plurality of imaging sensors, a plurality of acoustic sensors and a plurality of contact detectors.

Advantageously, the data representative of a location of one or more obstacles is an extraction of a number of characteristic points from a map of pixels representing a probability of absence of an obstacle in said pixels.

Advantageously, the map of pixels is produced at the output of at least a second sensing procedure and a data fusion process which increases an estimate of a confidence level of the probabilities of absence of an obstacle in said map of pixels in relation to a first sensing procedure.

Advantageously, the probability of absence of an obstacle in a pixel of the map decreases over a preset time parameter down to 0.5 unless updated by an output of a sensing procedure with a higher probability.

Advantageously, an envelope of a footprint of the robot is calculated as a function of the speed of the robot and predetermined guards around the robot.

Advantageously, the series of commands is calculated to determine a changed trajectory to avoid collision of the envelope with any obstacle.

Advantageously, the series of commands is further calculated to determine a changed trajectory and a changed speed to rejoin a target point of the initial trajectory at a time when the robot should have reached the target point on the initial trajectory.

Advantageously, an upper member of the robot comprises a chain of segments articulated together by motored joints.

Advantageously, an envelope of a member of the robot is calculated as a function of a predetermined guard around the articulated segments.

Advantageously, the series of commands is calculated to determine a reduction in angular speeds of the motors of the joints of the articulated segments when the envelope approaches an obstacle.

Advantageously, the reduction in angular speeds of the motors of the joints is calculated to saturate a maximum velocity of the chain.

The invention also discloses a humanoid robot comprising: at least an upper member and a lower member; a memory storing an initial trajectory with a target point and computer code instructions; a plurality of sensing modules configured to acquire data representative of a position of one or more obstacles; a processor configured to execute said computer code instructions to calculate: an envelope of one of a footprint of said robot and said at least one of upper and lower members thereof; a relative position of the envelope and the one or more obstacles; a probability of collision of the envelope with an obstacle; and, a series of commands to change at least one of the trajectory and a speed of the at least one of upper and lower members of the robot; said robot being characterized in that the series of commands is conditioned in at least one of space and time to: i) avoid collision of the envelope with an obstacle; and ii) when adequate and possible, rejoin the target point of the initial trajectory stored in memory.

The invention also allows the robot to rejoin a pre-calculated trajectory, whether this trajectory is only calculated as part of a navigation step of the robot to move to a predetermined location, or it is part of a choreography, executed by the robot on its own, or within a choreography executed by a plurality of robots. In these embodiments, the trajectory of the robot is re-synchronized with the pre-planned trajectory, so that the avoidance is seen as being absolutely natural. Advantageously, the upper members of the robot are also controlled in order to be able to avoid obstacles in their environment. In these embodiments, the gestures of the upper members are also re-synchronized with the pre-planned gestures, or adapted so that they appear to be all the most natural.

BRIEF DESCRIPTION OF THE DRAWINGS

The invention will be better understood and its various features and advantages will emerge from the following description of a number of exemplary embodiments and its appended figures in which.

DETAILED DESCRIPTION

Figure 1:
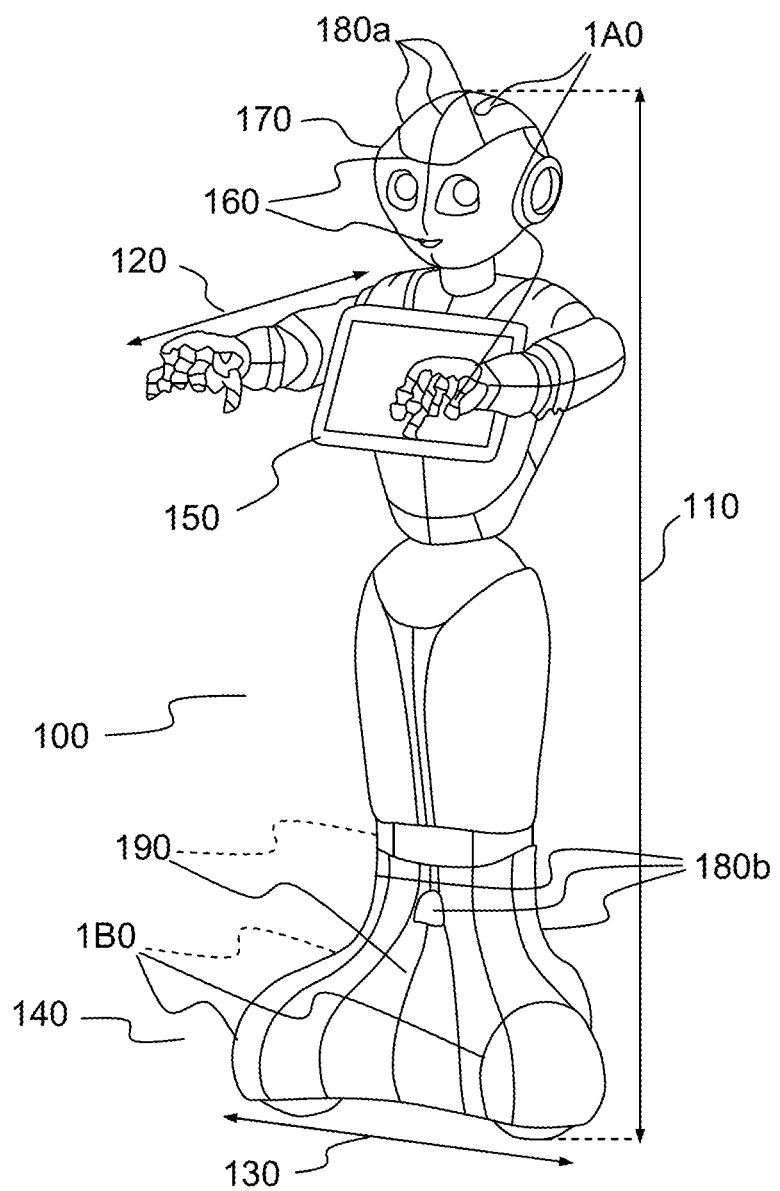
FIG. 1 displays a physical architecture of a humanoid robot in a number of embodiments of the invention.

The specific robot 100 on the figure is taken as an example only of a humanoid robot in which the invention can be implemented. The lower limb of the robot on the figure is not functional for walking, but can move in any direction on its base 140 which rolls on the surface on which it lays. The invention can be easily implemented in a robot which is fit for walking. By way of example, this robot has a height 110 which can be around 120 cm, a depth 120 around 65 cm and a width 130 around 40 cm. In a specific embodiment, the robot of the invention has a tablet 150 with which it can communicate messages (audio, video, web pages) to its environment, or receive entries from users through the tactile interface of the tablet. In addition to the processor of the tablet, the robot of the invention also uses the processor of its own motherboard, which can for example be an ATOM™ Z530 from Intel™. The robot of the invention also advantageously includes a processor which is dedicated to the handling of the data flows between the motherboard and, notably, the boards bearing the Magnetic Rotary Encoders (MREs) and sensors which control the motors of the joints in a limb and the balls that the robot uses as wheels, in a specific embodiment of the invention. The motors can be of different types, depending on the magnitude of the maximum torque which is needed for a definite joint. For instance, brush DC coreless motors from E-minebea™ (SE24P2CTCA for instance) can be used, or brushless DC motors from Maxon™ (EC45_70W for instance). The MREs are preferably of a type using the Hall effect, with 12 or 14 bits precision.

In embodiments of the invention, the robot displayed on FIG. 1 also comprises various kinds of sensors. Some of them are used to control the position and movements of the robot. This is the case, for instance, of an inertial unit, located in the torso of the robot, comprising a 3-axes gyrometer and a 3-axes accelerometer. The robot can also include two 2D color RGB cameras 160 on the forehead of the robot (top and bottom) of the System On Chip (SOC) type, such as those from Shenzen V-Vision Technology Ltd™ (OV5640), with a 5 megapixels resolution at 5 frames per second and a field of view (FOV) of about 57° horizontal and 44° vertical. One 3D sensor 170 can also be included behind the eyes of the robot, such as an ASUS XTION™ SOC sensor with a resolution of 0.3 megapixels at 20 frames per second, with about the same FOV as the 2D cameras. The robot of the invention can also be equipped with laser lines generators, for instance three in the head 180a and three in the base 180b, so as to be able to sense its relative position to objects/beings in its environment. The robot of the invention can also include microphones to be capable of sensing sounds in its environment. In an embodiment, four microphones with a sensitivity of 300 mV/Pa+/−3 dB at 1 kHz and a frequency range of 300 Hz to 12 kHz (−10 dB relative to 1 kHz) can be implanted on the head of the robot. The robot of the invention can also include two sonar sensors 190, possibly located at the front and the back of its base, to measure the distance to objects/human beings in its environment.

The robot can also include tactile sensors, on its head and on its hands, to allow interaction with human beings. It can also include bumpers 1B0 on its base to sense obstacles it encounters on its route.

The robot can also sense contact of its upper members with objects that they touch by calculating a difference between a planned trajectory and an actual trajectory. A method to this effect is disclosed by European patent application filed the same day by the same applicant under no EP14305848.5.

To translate its emotions and communicate with human beings in its environment, the robot of the invention can also include:

LEDs, for instance in its eyes, ears and on its shoulders;
Loudspeakers, for instance two, located in its ears.

The robot of the invention may communicate with a base station or other robots through an Ethernet RJ45 or a WiFi 802.11 connection.

The robot of the invention can be powered by a Lithium Iron Phosphate battery with an energy of about 400 Wh. The robot can access a charging station fit for the type of battery that it includes.

Position/movements of the robots are controlled by its motors, using algorithms which activate the chains defined by each limb and effectors defined at the end of each limb, in view of the measurements of the sensors.

From sensors 160, 170, 180, 190, 1A0 or 1B0, or from the result of an evaluation of a contact of its upper members with an object, the computing modules of the robot can compute a local map of the obstacles in its environment, as disclosed by European patent application filed the same day as this application under no EP14305849.3.

Figure 2:
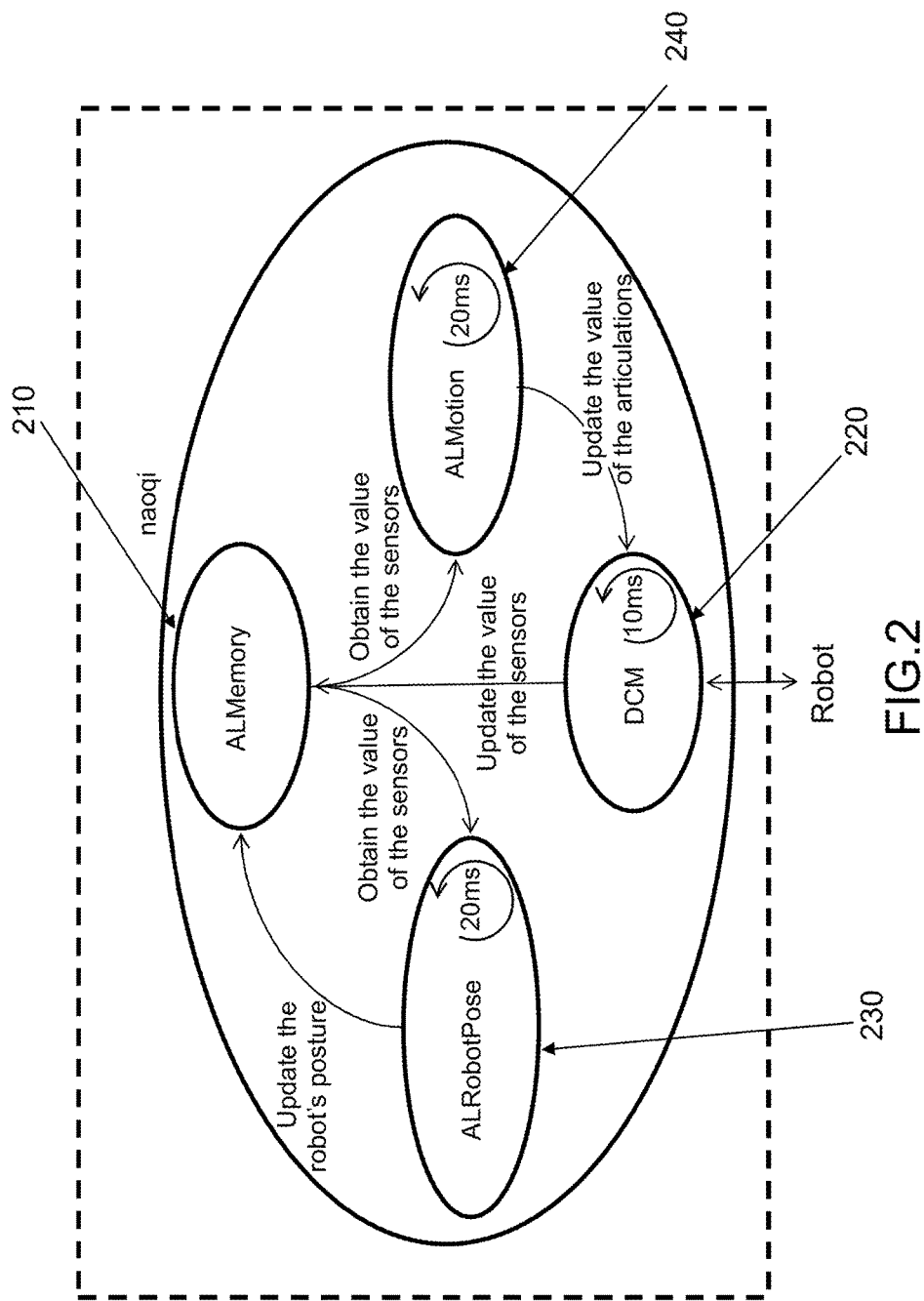
FIG. 2 displays a functional architecture of the software modules of the robot in a number of embodiments of the invention.

FIG. 2 displays a functional architecture of the software modules of the robot in a number of embodiments of the invention.

FIG. 2 is a diagram of a physical and functional architecture allowing the implementation of the invention in several of its embodiments. A robot of this type is advantageously endowed with high-level software allowing the piloting of the functions of the robot in an embodiment of the invention. A software architecture of this type, dubbed NAOQI, has been disclosed notably in patent application WO2009/124955 published on Oct. 15, 2009. It comprises the basic functions for managing the communications between a robot and a PC or a remote site and exchanging software which provides the software infrastructure necessary for the implementation of the present invention. Also, European patent application no EP14305578.8 discloses an operating system designed to operate a robot with advanced interaction/dialog capabilities.

NAOQI is a framework optimized for robotic applications; it supports several languages, notably C++, Python and Urbi. Within the context of the present invention, the following modules of NAOQI are particularly useful:
the module ALMemory, 210, manages a memory shared between the various modules of NAOQI;
the module DCM, 220, manages the communications with the physical robot (motors, sensors);
the module ALRobotPose, 230, computes the current posture of the robot by comparing with the reference postures;
the ALMotion module, 240, manages the robot's movements.

These four modules are advantageously coded in C++. The figure also indicates the data flows between modules. In particular, the inputs necessary for the implementation of the Fall collision avoidance functions are:
the values of the sensors (cameras, laser lines generators, sonars, tactile sensor, for example);
the robot's posture.

In the case of detecting a possible collision, the specific functions designed to implement the instant invention dispatch commands for updating the trajectory of the robot.

Also indicated in the figure, purely by way of illustration, are values of the refresh cycles for the data processed by each module: 20 ms for the updating of the robot's posture and the fall management data; 10 ms for the values of some of the sensors. A map of the obstacles in the environment of the robot can be refreshed every 100 ms, which is the typical cycle time for processing images acquired by a 3D camera, by way of example, only.

Figure 3:
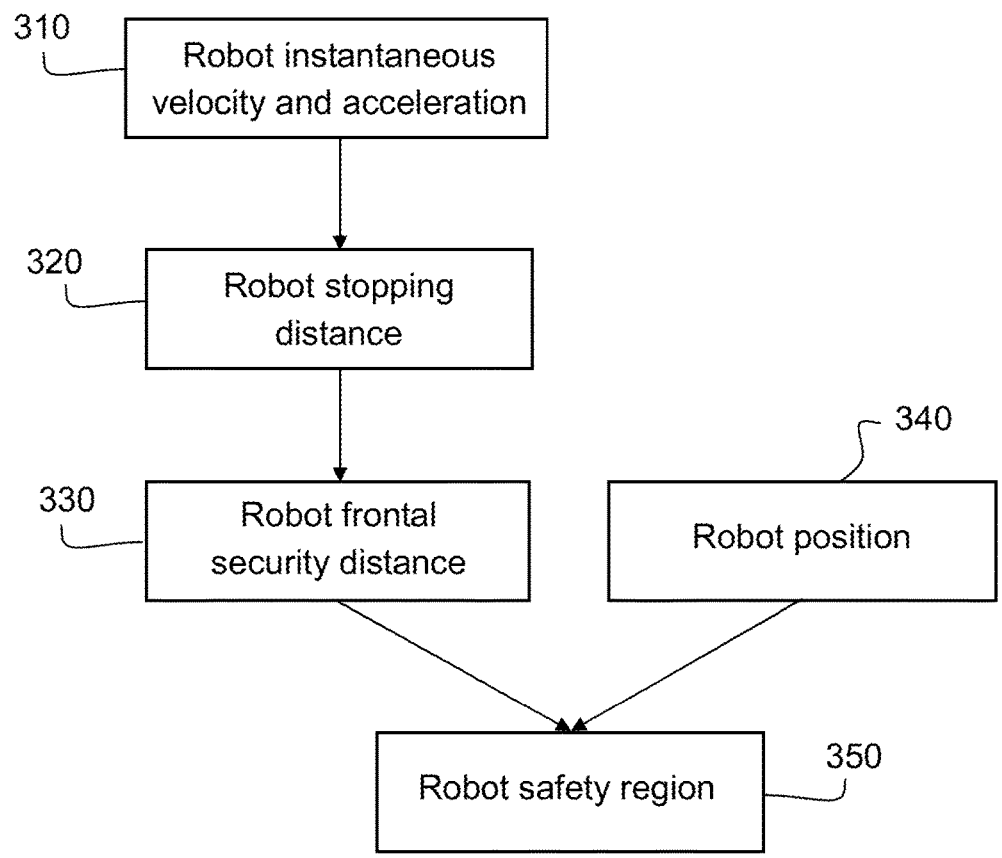
FIG. 3 displays a flow chart to implement an aspect of the method of the invention in a number of its embodiments.

FIG. 3 displays a flow chart to implement an aspect of the method of the invention in a number of its embodiments.

The robot instantaneous velocity and acceleration obtained 310 from the ALRobotPose module 230 are continuously processed to compute 320 a robot stopping distance, and a robot frontal security distance is calculated 330 therefrom.

From this output and a calculated robot position, a robot safety region is determined 340.

The invention defines regions around the robot that must be clear of obstacles for the robot to move. The size and shape of these regions depend on the robot instantaneous velocity, in translation and rotation. The shape of the safety region is determined so that:
No point of the robot should come closer to an obstacle than a certain distance called minimum distance, 10 cm in a purely exemplary implementation;
No point should be inside the region swept by the stopping robot, should the robot stop immediately;
The safety region size in the motion direction is increased by a certain distance, called frontal distance, which depends continuously on the robot stopping distance; in an implementation of the invention, taken purely by way of example, the frontal distance is taken to be equal tot the minimum distance at low speed (i.e. 10 cm), and 40 cm at full speed, but depending on the actual speeds of the robot, different values may be selected and calculated using the formula below which returns the results in the table.

The extra distance included in the maximum frontal distance is there to account for sensor uncertainty, sensor delay, and the comfort of people around the robot.

Frontal security distance F is computed from the following formula:

$$F = MD + \frac{SD}{MSD} \times (MFD - MD)$$

Wherein:
MD=Minimum Distance
SD=Stopping Distance
MSD=Maximum Stopping Distance
MFD=Maximum Frontal Distance Examples of the frontal security distance (in meters) as a function of the speed of the robot (in meters per second) are given by the table below:

| Speed (m/s) | Frontal security distance (m) |
| --- | --- |
| 0.1 | 0.12 |
| 0.2 | 0.17 |
| 0.3 | 0.25 |
| 0.35 | 0.30 |
| 0.4 | 0.35 |
| 0.5 | 0.40 |
| 0.55 | 0.40 |

As can be seen, the minimum frontal security distance for a robot moving at its minimum speed of 0.1 m/s is just above the minimum distance of 10 cm which is the absolute limit for a robot which is not moving. The frontal security distance then increases up to 30 cm for the speed of 0.35 m/s which is a most common default speed for a humanoid robot of the type disclosed by this invention.

The frontal security distance does not increase above the maximum speed of the robot (0.55 m/s) for which a frontal security distance of 40 cm is necessary.

FIGS. 4a, 4b, 4c, 4d, 4e and 4f illustrate in a more detailed manner the computation of the safety areas around the robot in a number of embodiments of the invention.

On these figures, an autonomous robot 410a, 410c, 410e is moving at oriented speed 420a, 420c or 420e. It can be seen that speed 420c is greater than speed 420a. Also, the movement of the robot 410e is oriented to the left of the robot, at approximately the same frontal speed 420e as the frontal speed 420c or the robot 410c.

Figure 4A:
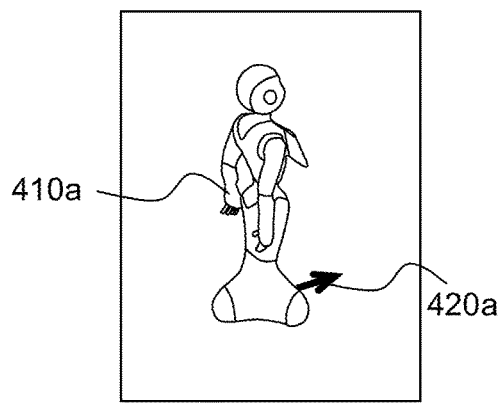
FIGS. 4a, 4b, 4c, 4d, 4e and 4f illustrate in a more detailed manner the computation of the safety areas around the robot in a number of embodiments of the invention.
Figure 4B:
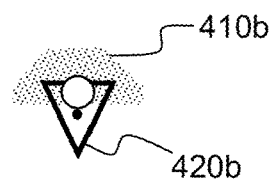
Figure 4C:
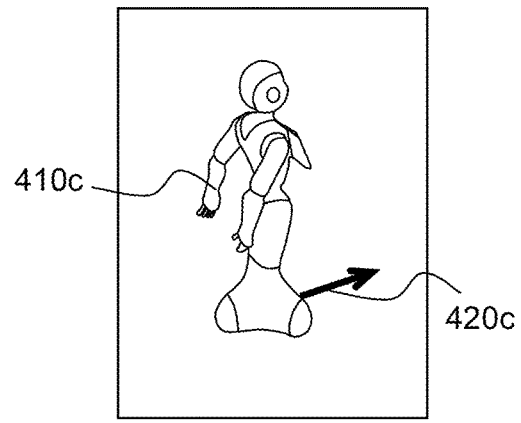
Figure 4D:
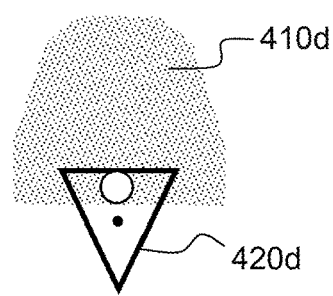
Figure 4E:
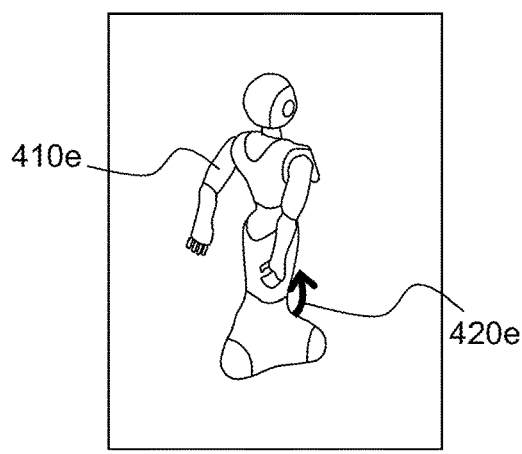
Figure 4F:
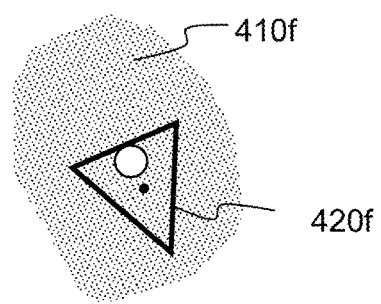

Safety regions 410b, 410d and 410f are defined around the robot and these safety regions have different sizes which depend on the speed of the robot. In FIGS. 4b, 4d, 4f, the orientation of the triangles 420b, 420d, 420f depend on the orientation of the movement of the robot. Meanwhile the sizes of triangles 420b, 420d, 420f, depend on the instant speed of the robot, and their respective sizes increase with the speed of the robot. The safety region is defined around the robot and not around each obstacle as it is in the prior art. Also, the safety region rotates with the robot as illustrated by FIG. 4f.

Figure 5A:
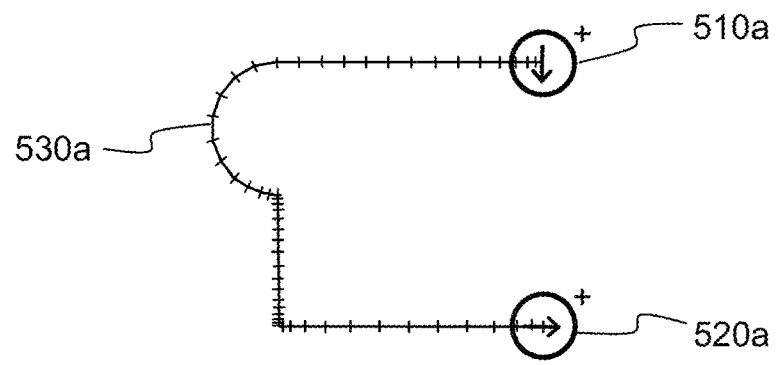
FIGS. 5a, 5b and 5c illustrate in a more detailed manner the computation of the re-synchronized trajectory in a number of embodiments of the invention.
Figure 5B:
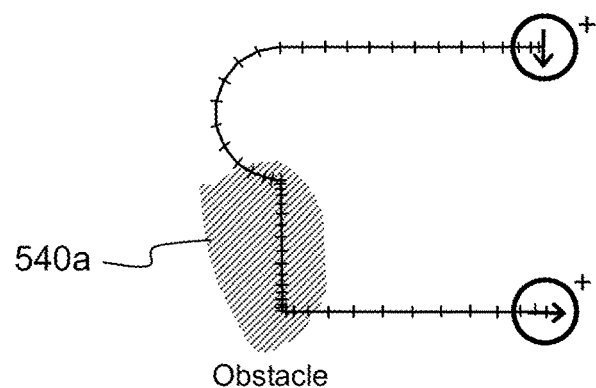
Figure 5C:
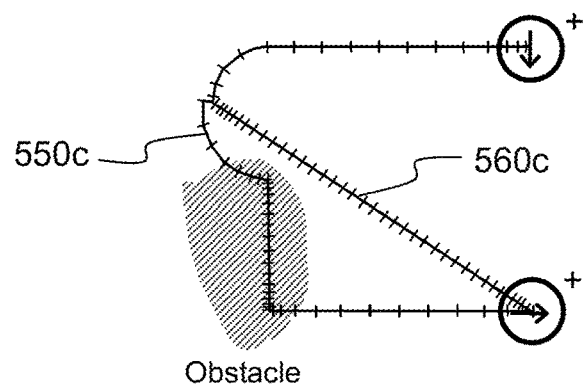

FIGS. 5a, 5b and 5c illustrate in a more detailed manner the computation of the re-synchronized trajectory in a number of embodiments of the invention.

The robot of the invention may either execute displacements which are only directed by an objective of the robot to go from a first point 510a to a second point 520a. Under these circumstances, the timing of the displacement and the associated movements of the members of the robot are not very important. Therefore, a robot which will have to change its trajectory 530a to go from the first point to the second point to avoid an obstacle 540b will not be constrained in time to rejoin the second point after a detour has been executed to avoid the obstacle. But the displacements and the motion of the members of the robot have to be coordinated to execute a choreography either as a stand alone robot or in conjunction with other robots or with human beings, the time when the second point 520a is reached needs to be consistent with the choreography, i.e. must be equal to the time initially planned.

It can be seen on the figures that the initial trajectory 530a will be changed when an obstacle 540a is determined to be possibly on a collision route.

The presence of an obstacle in the safety area around the robot while it advances on its trajectory is detected using for example the method disclosed by European patent no EP14305849.3 filed the same day as this application in the name of the same assignee. According to this method, a local pixel map of the environment of the robot is created around the robot, where the probability that there is no obstacle on a trajectory is determined by correlating the measurements from a number of sensors (typically cameras—2D or 3D, laser line generators, sonars, tactile sensors . . . ). The map can be a cylinder whose base is a projection on the progression surface of the robot, but can also be, in some implementations, a full 3D volume.

When this is the case, the initial trajectory 550c is not executed and replaced with a new segment 560c, where the speed of the robot has to be adapted so that the robot is capable of rejoining the second point 520a at the moment when it was initially planned. Accordingly, the method of the invention automatically computes a motion that either stops or only changes the direction of the robot and then rejoins the initial trajectory at the second point, while keeping in a correct absolute position and the timing of the trajectory.

Figure 6:
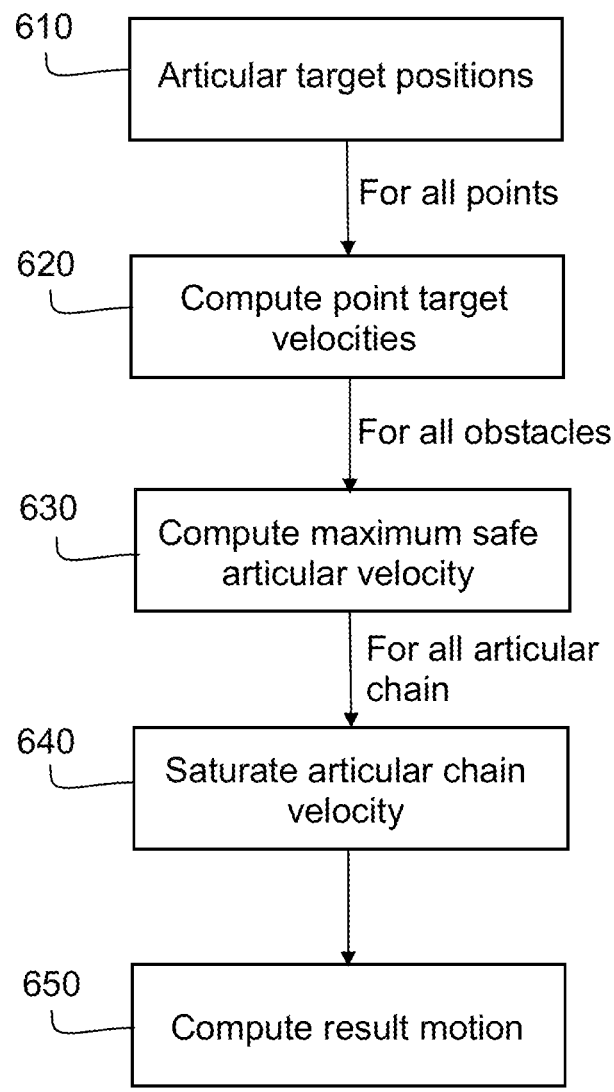
FIG. 6 displays a flow chart to implement another aspect of the invention in a number of its embodiments.

FIG. 6 displays a flow chart to implement another aspect of the invention in a number of its embodiments.

The invention also solves the same problem of avoiding collision with obstacles on a trajectory while preserving the initial timing of the trajectory in the case of movements executed by the members of the robot.

In this case, the problem lies in the movements of the joints which have to be controlled in a manner which both avoids collision and preserves the general direction and content of the initial gesture, while possibly changing the velocity and amplitude of the gesture.

This result is achieved for instance by implementing the following steps:

At every control cycle, the motion controller takes 610 as input an joint target position for every articulation; this target may come from a choreographed animation or may be the result of a computation;

From this target position, the method computes 620 the target velocity of every point of the robot;

For all points, the method computes 630 a maximum joint velocity for the chain containing the point; this velocity depends 640 on the position of obstacles near the point; the velocity is low when obstacles are near the point and in the direction of its target velocity, it is unbounded when the obstacle is far or when it is in the opposite direction of the point target velocity, and it depends continuously on the relative obstacle positions in between.

The velocity of the joints in the chain is therefore saturated at its maximum safety value.

The maximum safety value of the velocity of the joints may be calculated, by way of example, as described below.

Polar position of the obstacle relatively to the robot point is denoted $(d, \theta)$, where $\theta=0$ when the obstacle is in the direction of the target velocity. Let $f(d, \theta)$ be the chain maximum safety velocity, and $\theta_{min}$, $\theta_{max}$, $d_{min}$, $d_{max}$, $f_{min}$, $f_{max}$ some user defined parameters. Then:

$f(d,\theta)=f_{min}$, if $\theta \leq \theta_{min}$ and $d \leq d_{min}$ $f(d,\theta)=f_{min}+(d-d_{min})/(d_{max}-d_{min})*f_{max}$, if $\theta \leq \theta_{min}$ and $d_{min} \leq d \leq d_{max}$ $f(d,\theta)=f_{max}$, if $\theta \leq \theta_{min}$ and $d_{max} \leq d$ $f(d,\theta)=f(d,0)+(\theta-\theta_{min})/(\theta_{max}-\theta_{min})*(f_{max}-f(d,0))$, if $\theta_{min} \leq \theta \leq \theta_{max}$ $f(d,\theta)=f_{max}$ if $\theta \geq \theta_{max}$ In an embodiment, we can use the following user defined parameters: $\theta_{min}=\pi/4$ rad, $\theta_{max}=3\pi/4$ rad, $d_{min}=0.1$ m, $d_{max}=0.5$ m, $f_{min}=0$ rad/s and $f_{max}=6$ rad/s.

But other values can be set, depending on the scenario of use of the robot. One can also define a dynamic setting of the parameters, depending on the environment of the robot.

Then, the result motion is calculated 650.

Figure 7:
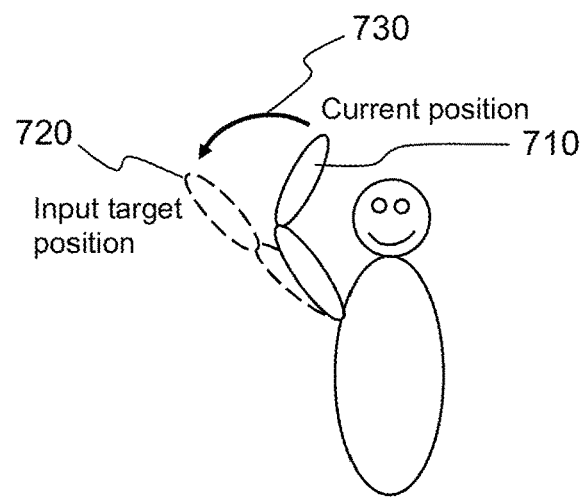
FIG. 7 illustrates the actuation of the members of the upper members of the robot of the invention in a number of its embodiments.

FIG. 7 illustrates the actuation of the members of the upper members of the robot of the invention in a number of its embodiments.

The target position 720 of the upper member chain is input in the computation and the gesture to move the member chain from the initial position 710 to the target position 720, using a trajectory 730, is calculated for each joint using a saturation of its velocity taking account of the distance of the joint from an obstacle.

The position of the obstacles is determined using for instance the map of obstacles already mentioned, where a cylinder is built atop the 2D map, or using, in addition to the 2D map, a number of reference points directly obtained from some of sensors (for instance, the 3D camera). In some embodiments, an absolute minimum safety distance may be defined around each joint. Advantageously this absolute safety distance is around 10 cm.

Figure 8:
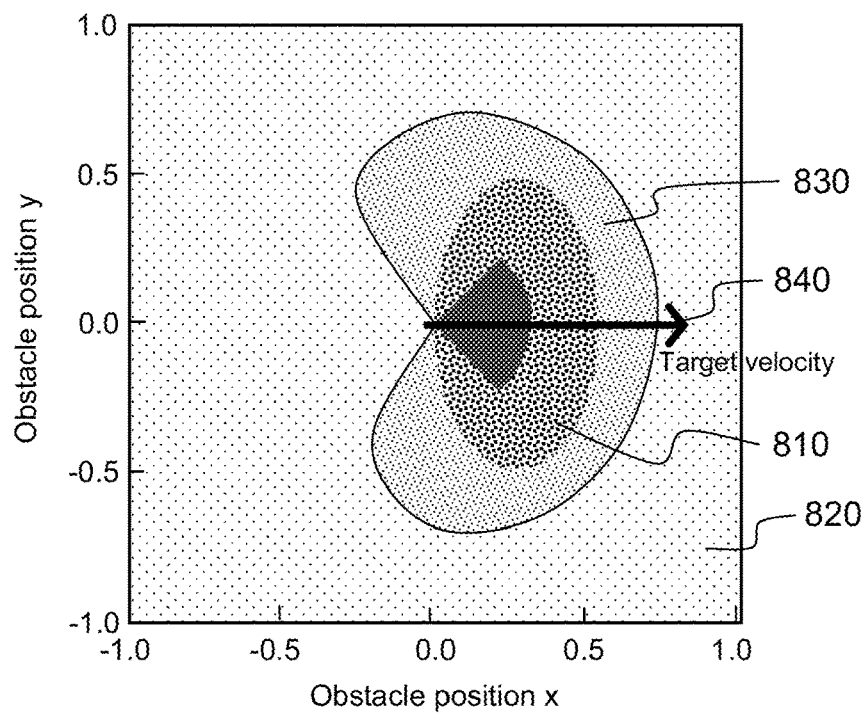
FIG. 8 illustrates the calculation of the safety area taking into account the upper members of the robot in a number of embodiments of the invention.

FIG. 8 illustrates the calculation of the safety area taking into account the upper members of the robot in a number of embodiments of the invention.

This figure shows maximum velocities depending on an obstacle position (x, y) relatively to a point of the robot and its target velocity direction 840. In the deep grey zone 810, the maximum speed is null. In the light grey zone 820, the maximum speed is unchanged. In the intermediate grey zone 830, the velocity of the joints in a chain of the robot is changed by defining a saturated velocity as already explained.

FIGS. 9a, 9b, 9c and 9d illustrate different collision avoidance strategies in a number of embodiments of the invention.

Figure 9A:
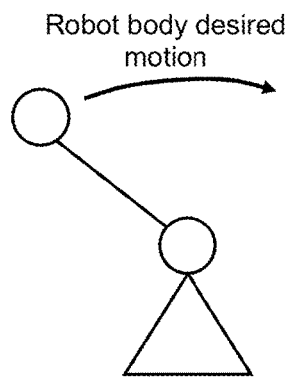
FIGS. 9a, 9b, 9c and 9d illustrate different collision avoidance strategies in a number of embodiments of the invention.

In the illustrative examples of these figures, a single joint is considered, with a reference motion to the right, as seen on FIG. 9a.

Figure 9B:
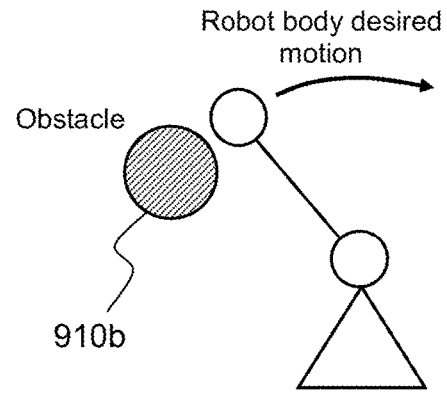

On FIG. 9b, the motion is unchanged, since the obstacle 910b is in the light grey zone 820.

Figure 9C:
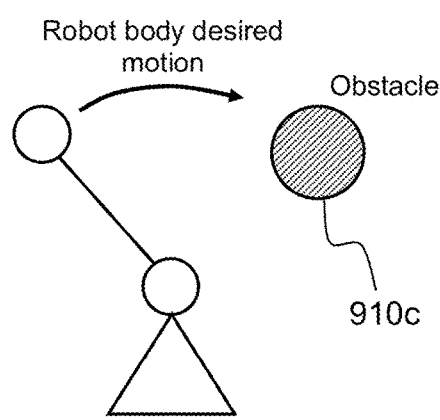

On FIG. 9c, the motion is slowed down, since the obstacle 910c is in the intermediate grey zone 830.

Figure 9D:
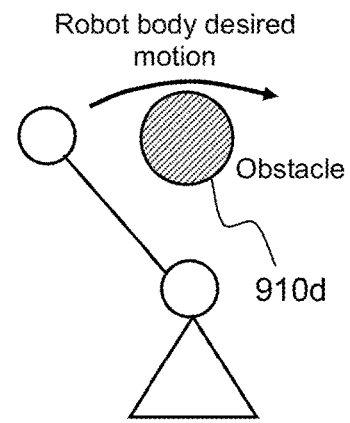

On FIG. 9d, the motion is stopped, since the obstacle 910d is in the deep grey zone 810.

A safety zone around the robot can therefore comprise obstacles on the progression surface and obstacles at an altitude relative to the progression surface. Change of trajectory determined by detection of obstacles in the 2D safety area will generally also protect the robot from a collision of its members with the second category of obstacles.

But this is not always true, notably when the robot is engaged in interaction with a human being who is further than the minimum security distance from the robot, but whose members can of course enter the safety zone. In this case the gestures of the robot must be controlled with care, using the embodiment where the joint speed is saturated based on detection of the distance with obstacles.

Therefore, the algorithms which, according to the invention, allow control of the 2D trajectory of the robot on its progression surface and the control of the angular velocities of the joints of its members will be executed concurrently, to make sure that no collision occurs during the interaction of the robot with the human being with who it is engaged.

The examples described above are given as illustrations of embodiments of the invention. They do not in any way limit the scope of the invention which is defined by the following claims.

The invention claimed is:

1. A method for controlling a trajectory of at least one of upper and lower members of a humanoid robot, said method comprising:
    storing an initial trajectory with a target point in a memory of the robot;
    acquiring, from at least a sensing procedure controlled from on-board the robot, data representative of a position of one or more obstacles; and
    calculating, by a processor on-board the robot:
        an envelope of said robot, said envelope depending on a speed and a direction of the robot;
        a relative position of the envelope and the one or more obstacles;
        a probability of collision of the envelope with one of said one or more obstacles; and,
        a series of commands in order to: i) avoid collision of the envelope with said one of said one or more obstacles; and ii) at least one of rejoin the target point of the initial trajectory stored in memory within an initial timing, and preserve the general direction and content of an initial gesture, to change in at least one of space and time at least one of the trajectory or a speed of the at least one of upper and lower members of the robot.

2. The method of claim 1, wherein the series of commands to rejoin the target point comprises:
    calculating a point of the initial trajectory;
    calculating a straight line between the point of the initial trajectory, and the target point;
    calculating a speed of the robot in the straight line to rejoin the target point at the initial timing; and
    defining the trajectory of the robot as the initial trajectory until the point of the initial trajectory, then the straight line between the point of the initial trajectory, and the target point.

3. The method of claim 1, wherein the series of commands to preserve the general direction and content of the initial gesture comprises calculating a target position for a point of the robot, said point on a trajectory, computing a maximum joint velocity for a chain containing the point, said maximum joint velocity depending of the distance between the point and said one of said one or more obstacles.

4. The method of claim 1, wherein the initial trajectory is referenced in space and time.

5. The method of claim 1, wherein the sensing procedure is performed by at least one of a plurality of laser lines generators, a plurality of imaging sensors, a plurality of acoustic sensors and a plurality of contact detectors.

6. The method of claim 5, wherein the sensing procedure is performed by at least two of a plurality of laser lines generators, a plurality of imaging sensors, a plurality of acoustic sensors and a plurality of contact detectors.

7. The method of claim 1, wherein the data representative of a location of one or more obstacles is an extraction of a number of characteristic points from a map of pixels representing a probability of absence of said one of said one or more obstacles in said pixels.

8. The method of claim 1, wherein an envelope of a footprint of the robot is calculated as a function of the speed of the robot and predetermined guards around the robot.

9. The method of claim 8, wherein the series of commands is calculated to determine a changed trajectory to avoid collision of the envelope with any obstacle.

10. The method of claim 9, wherein the series of commands is further calculated to determine a changed trajectory and a changed speed to rejoin a target point of the initial trajectory at a time when the robot should have reached the target point on the initial trajectory.

11. The method of claim 1, wherein an upper member of the robot comprises a chain of segments articulated together by motored joints.

12. The method of claim 11, wherein an envelope of a member of the robot is calculated as a function of a predetermined security distance around the articulated segments.

13. The method of claim 11, wherein the series of commands is calculated to determine a reduction in angular speeds of the motors of the joints of the articulated segments when the envelope approaches said one of said one or more obstacles.

14. The method of claim 13, wherein the reduction in angular speeds of the motors of the joints is calculated to saturate a velocity of the chain to a maximum safety value, said maximum safety value being calculated based on a target velocity of a point in the chain, and positions of said one or more obstacles relative to said point in the chain.

15. A humanoid robot comprising:
- at least an upper member and a lower member;
- a memory storing an initial trajectory with a target point and computer code instructions;
- a plurality of sensing modules configured to acquire data representative of a position of one or more obstacles; and
- a processor configured to execute said computer code instructions to calculate:
  - an envelope of said robot, said envelope depending on a speed and a direction of the robot;
  - a relative position of the envelope and the one or more obstacles;
  - a probability of collision of the envelope with one of said one or more obstacles; and
  - a series of commands in order to: i) avoid collision of the envelope with said one of said one or more obstacles; and ii) at least one of rejoin the target point of the initial trajectory stored in memory within an initial timing, and preserve the general direction and content of an initial gesture, to change in at least one of space and time at least one of the trajectory or a speed of the at least one of upper and lower members of the robot.

* * * * *